United States Patent
Liu et al.

(10) Patent No.: US 12,475,789 B2
(45) Date of Patent: Nov. 18, 2025

(54) METHOD FOR COLLISION WARNINGS SPECIFYING DIRECTION, SYSTEM, AND TRANSPORTATION APPLYING METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Young-Way Liu, New Taipei (TW); Jung-Yi Lin, New Taipei (TW); Nien-Che Li, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 382 days.

(21) Appl. No.: 17/844,155

(22) Filed: Jun. 20, 2022

(65) Prior Publication Data

US 2022/0415174 A1     Dec. 29, 2022

(30) Foreign Application Priority Data

Jun. 29, 2021    (CN) .......................... 202110724661.9

(51) Int. Cl.
```
G08G 1/16       (2006.01)
B60Q 1/26       (2006.01)
B60Q 1/50       (2006.01)
B60Q 9/00       (2006.01)
B60W 30/095     (2012.01)
```
(Continued)

(52) U.S. Cl.
CPC ............... G08G 1/16 (2013.01); B60Q 9/008 (2013.01); G06T 7/60 (2013.01); G06T 7/70 (2017.01); G06V 10/40 (2022.01); G06V 10/751 (2022.01); G06V 20/56 (2022.01); G06V 20/70 (2022.01);
(Continued)

(58) Field of Classification Search
CPC .......... G06V 10/7514; G06V 20/7056; G06V 2201/07; G08G 1/16616; B60Q 1/535; B60Q 9/008
See application file for complete search history.

(56) References Cited

U.S. PATENT DOCUMENTS

| | | | |
|---|---|---|---|
| 7,895,788 B1 * | 3/2011 | Cilia | F41G 1/473 42/106 |
| 11,840,253 B1 * | 12/2023 | Pertsel | G06N 3/0464 |
| 2021/0287546 A1 * | 9/2021 | Englander | G08G 1/166 |

FOREIGN PATENT DOCUMENTS

| | | |
|---|---|---|
| CN | 107554422 A | 1/2018 |
| CN | 109300268 A | 2/2019 |

(Continued)

*Primary Examiner* — Gregory A Morse
*Assistant Examiner* — Ronde Lee Miller
(74) *Attorney, Agent, or Firm* — ScienBiziP, P.C.

(57) ABSTRACT

A method for directionally warning as to a target object behind a vehicle acquires images of environment surrounding the vehicle. Objects in the environment images are identified and high-risk target object or objects from all the objects is labeled. A relative direction and a relative location of the target object with the transportation are confirmed. A warning device is adjusted based on the relative direction and the relative location. The warning device gives directional warning as to the target object. A collision risk warning system and a transportation applying the method are also disclosed.

12 Claims, 4 Drawing Sheets

(51) Int. Cl.
  *B60W 50/00* (2006.01)
  *G06T 7/246* (2017.01)
  *G06T 7/60* (2017.01)
  *G06T 7/70* (2017.01)
  *G06V 10/40* (2022.01)
  *G06V 10/75* (2022.01)
  *G06V 20/56* (2022.01)
  *G06V 20/70* (2022.01)

(52) U.S. Cl.
  CPC .............. *G06T 2207/30252* (2013.01); *G06V 2201/07* (2022.01)

(56) References Cited

FOREIGN PATENT DOCUMENTS

| | | |
|---|---|---|
| CN | 111369831 A | 7/2020 |
| CN | 113022441 A | 6/2021 |
| KR | 20150042479 A1 | 4/2015 |

\* cited by examiner

METHOD FOR COLLISION WARNINGS SPECIFYING DIRECTION, SYSTEM, AND TRANSPORTATION APPLYING METHOD

FIELD

The subject matter herein generally relates to road safety, particularly a method, a system, and a transportation-mounted device for directionally warning a collision from the rear of the transportation.

BACKGROUND

Cars are an indispensable part of human life. When other vehicles behind a vehicle being driven are too close to the driven vehicle, risk of a collision becomes higher, but a driver of the vehicle being driven may be concentrating on the road ahead rather than what is behind him.

Thus, there is room for improvement in the art.

BRIEF DESCRIPTION OF THE FIGURES

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides a method, a collision risk warning system, and a transportation for giving directional warning as to risk of a collision.

Figure 1:
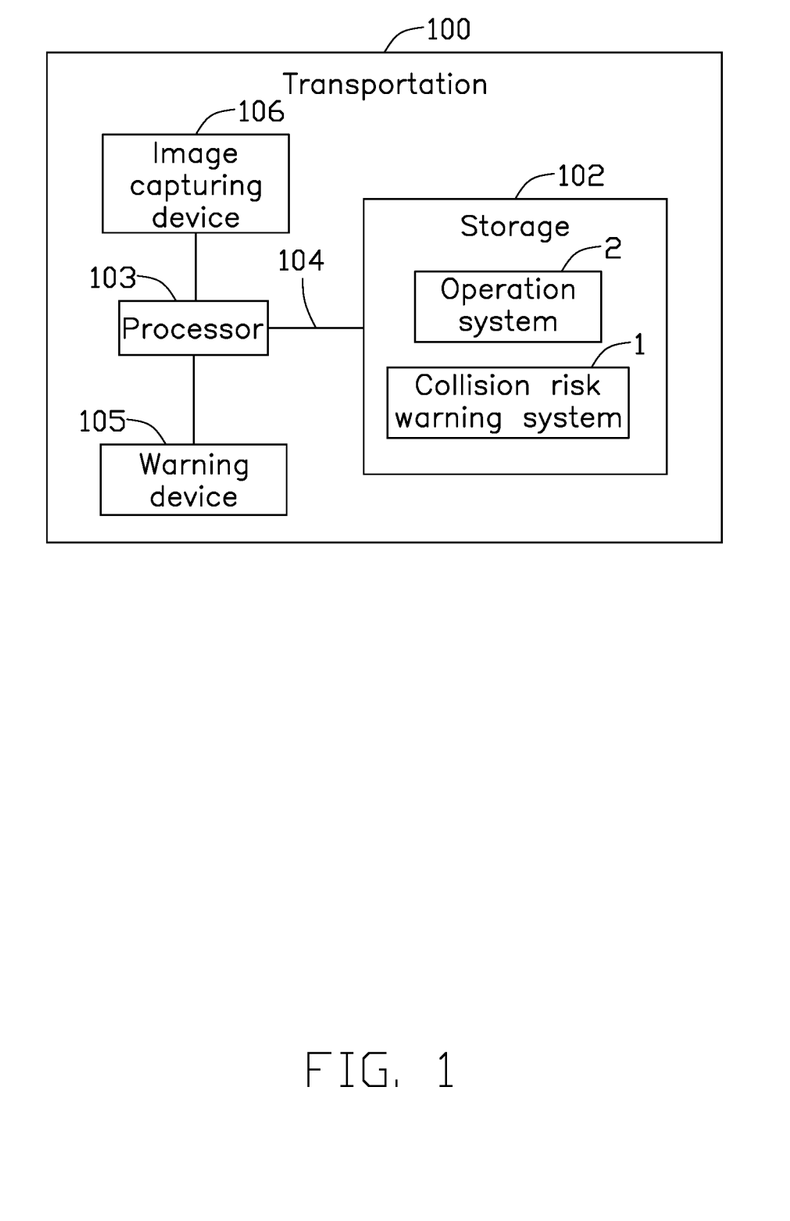
FIG. 1 is a diagram illustrating an embodiment of a transportation.

FIG. 1 shows a transportation 100. The transportation 100 includes a storage 102, a processor 103, a data bus 104, a warning device 105, and at least one image capturing device 106. In one embodiment, the transportation 100 can be a car, a bus, a bicycle, or a ship, not being limited. The transportation 100 communicates with a server in a specified protocol. The specified protocol can include a Hyper Text Transfer Protocol (HTTP), a Hyper Text Transfer Protocol over Secure Socket Layer (HTTPs), not being limited. The server can be a single server, and can be a server group with servers having different functions.

The storage 102 stores program codes. The storage 102 can be an embedded circuit having a storing function, such as a memory card, a trans-flash (TF) card, a smart media card, a secure digital card, and a flash card, and so on. The storage 102 exchanges data with the processor 103 through the data bus 104. The storage 102 stores a collision risk warning system 1 and an operation system 2. The storage 102 stores a white-list. The white-list stores some pre-stored specified information and corresponding personal information. The white-list stores related information of vehicles of acquaintances. For example, the white-list stores license plate numbers, names of the vehicle owners, and contact information. In other embodiments, the storage 102 can further store a black-list. The black-list stores information of other vehicles against whom a collision has previously been recorded or affecting a normal driving of the transportation 100.

The collision risk warning system 1 captures environment images surrounding the transportation 100, identifies objects appearing in the environment images, labels a target object from the objects, and controls the warning device 105 to focus on the target object.

The operation system 2 manages and controls hardware and software programs. The operation system 2 further supports operations of the collision risk warning system 1 and other software and programs.

Figure 2:
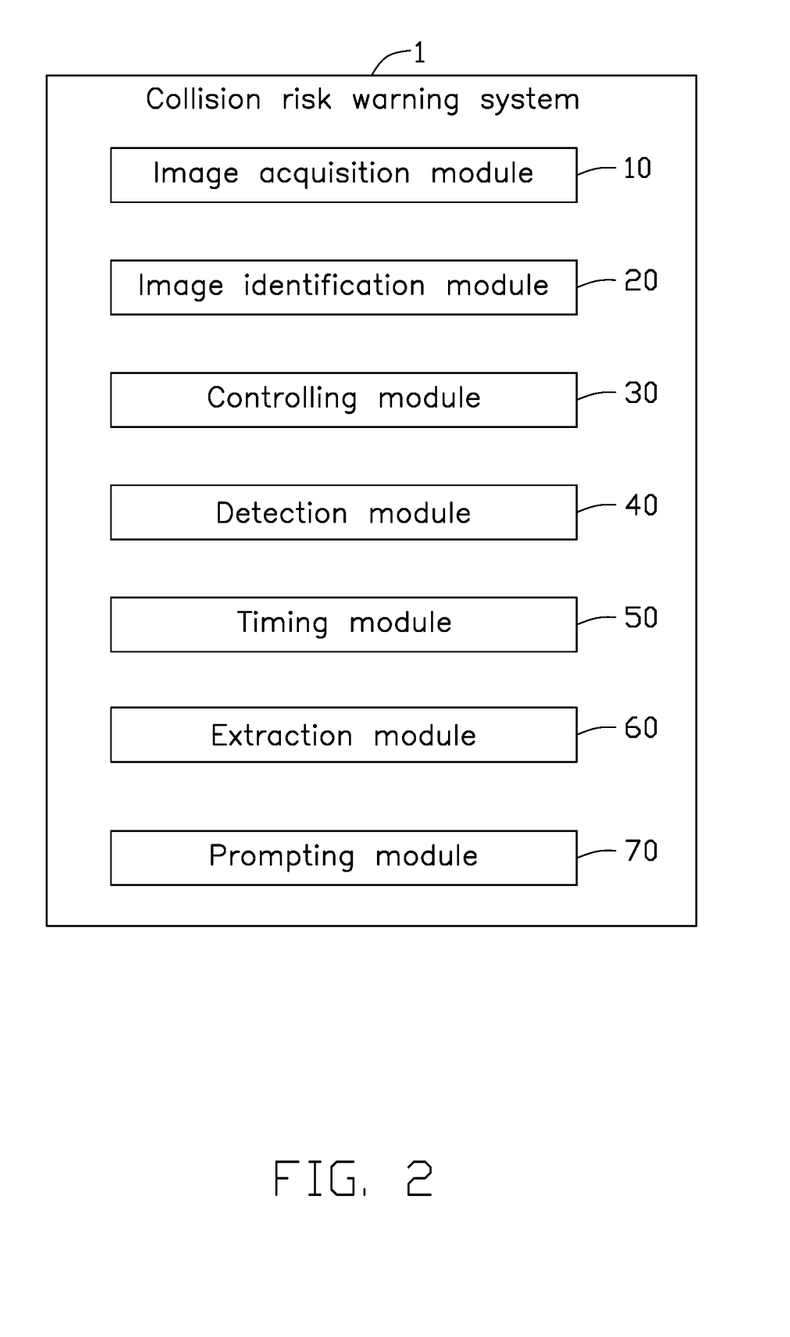
FIG. 2 is a diagram illustrating an embodiment of the collision risk warning system of FIG. 1.

The processor 103 can be a micro-processor or a digital processor. The processor 103 is used for running the program codes stored in the storage 102 to execute different functions. Modules 10-70 illustrated in FIG. 2 are program codes stored in the storage 102 and are implemented by the processor 103 for executing a method for warning as to a collision. The processor 103 can be a central processing unit (CPU), or a large scale integrated circuit, being an operating core and a control core.

The data bus 104 exchanges data with the storage 102 and the processor 103.

The warning device 105 focuses at the target object behind the transportation 100 to warn. The warning device 105 includes an aim region. The aim region is a region for locating a risk of collision. The warning device 105 is disposed at the rear of the transportation 100. In one embodiment, the warning device 105 is disposed inside the transportation 100, such as in a trunk. In other embodiments, the warning device 105 is disposed at the side of the transportation 100, such as adjacent to an exhaust pipe of the transportation 100. In one embodiment, the warning device 105 emits a missile to a passenger side without directly interfering with a driving action, such as paint bullets. In other embodiments, the warning device 105 emits a bright light to a passenger side without directly interfering with the driving action, such as a laser. In one embodiment, the warning device 105 include an aiming function for adjusting an angle between the warning device 105 and the target object, or adjusting a position of the warning device 105. In other embodiments, there is no aiming function in the warning device 105.

The at least one image capturing device 106 captures images or video. In one embodiment, the transportation 100 includes several image capturing devices 106. The image capturing device 106 can disposed inside or outside the transportation 100. The image capturing device 106 can be an automobile data recorder inside the transportation 100, or the camera disposed on a rearview mirror of the transportation 100. In other embodiments, the image capturing device 106 also can include a camera disposed on the rear of the transportation 100, such as at the trunk of the transportation 100 or at the middle of a rear windshield of the transportation 100, not being limited.

FIG. 2 shows the collision risk warning system 1. The collision risk warning system 1 includes a plurality of modules.

An image acquisition module 10 acquires environment images surrounding the transportation 100. In one embodiment, the image acquisition module 10 acquires the environment images surrounding the transportation 100 by the image capturing device 106. The environment images surrounding the transportation 100 can be an image of scene behind the transportation 100 or scene at a side of the transportation 100, not being limited.

In one embodiment, the environment image includes several objects, such as vehicles, pedestrians, animals, and buildings, not being limited.

An image identification module 20 identifies the objects in the environment images and applies a label to a target object from the objects.

In one embodiment, the target object of the objects can be a movable object, such as a motor vehicle, a non-motor vehicle, a pedestrian, an air vehicle, or an animal, not being limited.

Further, the image identification module 20 isolates the target objects from the environment images by an object detection algorithm. Selectively, sizes of the objects cut by the image identification module 20 from the environment images by the object detection algorithm is detected. When a size of the object is larger than a specified minimum threshold value, the object is considered as the target object. The specified minimum threshold value represents a safe distance between the object and the transportation 100.

When there is more than one target objects larger than the specified minimum threshold value, the image identification module 20 considers the object with a greatest size as the target object.

In one embodiment, the image identification module 20 can classify the objects, and sets different specified minimum threshold values corresponding to different categories. For example, a transportation category corresponds to a first specified minimum threshold value, an animal category corresponds to a second specified minimum threshold value, and an air vehicle category corresponds to a third specified minimum threshold value.

A controlling module 30 confirms a relative direction and a relative location of the target object with the transportation 100, adjusts the warning device 105 based on the relative direction and the relative location, and controls the warning device 105 to directionally warn the target object, such as a driver of a following vehicle, or an animal following the transportation 100.

Further, the controlling module 30 further adjusts the aim region of the warning device 105 to partly overlap the target object.

A detection module 40 detects whether the size of the target object is less than a specified maximum threshold value. When the size of the target object is less than the specified maximum threshold value, the detection module 40 considers the target object as sufficiently far away from the transportation 100, and the controlling module 30 disables the warning device 105. When the size of the target object is larger than or equal to the specified maximum threshold value, the detection module 40 considers the target object to potentially affect the driving of the transportation 100, and the controlling module 30 controls the warning device 105 to directionally warn the target object. In one embodiment, the specified maximum threshold value is larger than the specified minimum threshold value.

A timing module 50 counts a cumulative time while the target object being behind the transportation 100. In one embodiment, when the cumulative time is larger than a specified time threshold value, the timing module 50 regards the target object as similar to a stalker. When the cumulative time is less than or equal to the specified time threshold value, the timing module 50 considers the target object as one of many.

An extraction module 60 extracts feature information of the target object when the cumulative time of the target object is larger than the specified time threshold value. In one embodiment, the feature information of the target object include license plate number or a face information of the driver of the target object. In other embodiments, the feature information can be a shape of the target object, not being limited.

The extraction module 60 further compares the extracted feature information with the pre-stored specified information in the white-list.

A prompting module 70 generates a prompt information when the feature information is different from the pre-stored specified information in the white-list. The prompt information suggest an addition of the target object into the white-list.

In one embodiment, the prompt information is a pop-up window displayed on the transportation 100 or a display of a terminal device communicating with the transportation 100. In other embodiments, the prompt information can be shown in a full screen or in a notification bar. The terminal device can be a mobile phone, a wearable device, or an automobile data recorder, not being limited.

In one embodiment, the prompting information includes an adding key and a rejecting key. In one embodiment, an adding operation or a rejecting operation can be generated by a touch operation or a gesture operation on the transportation 100 or the terminal device communicated with the transportation 100. The adding key and the rejecting key can be virtual keys or physical keys.

When there is no adding operation or rejecting operation detected in a specified detection time duration, the target object is considered as similar to the stalker, the controlling module 30 controls the warning device 105 to directionally warn the target object.

In one embodiment, the specified maximum threshold value, the specified minimum threshold value, the specified time threshold value, and the specified detection time duration can be set according to user's requirement. The aim region can be adjusted due to different warning devices 105.

Based on the transportation 100, the objects behind the transportation 100 is captured by the image capturing device 106, the target object from the objects is identified, and a directionally warning is generated when the target object is close to the transportation 100. The aim region can be adjusted due to different warning devices 105.

Figure 3:
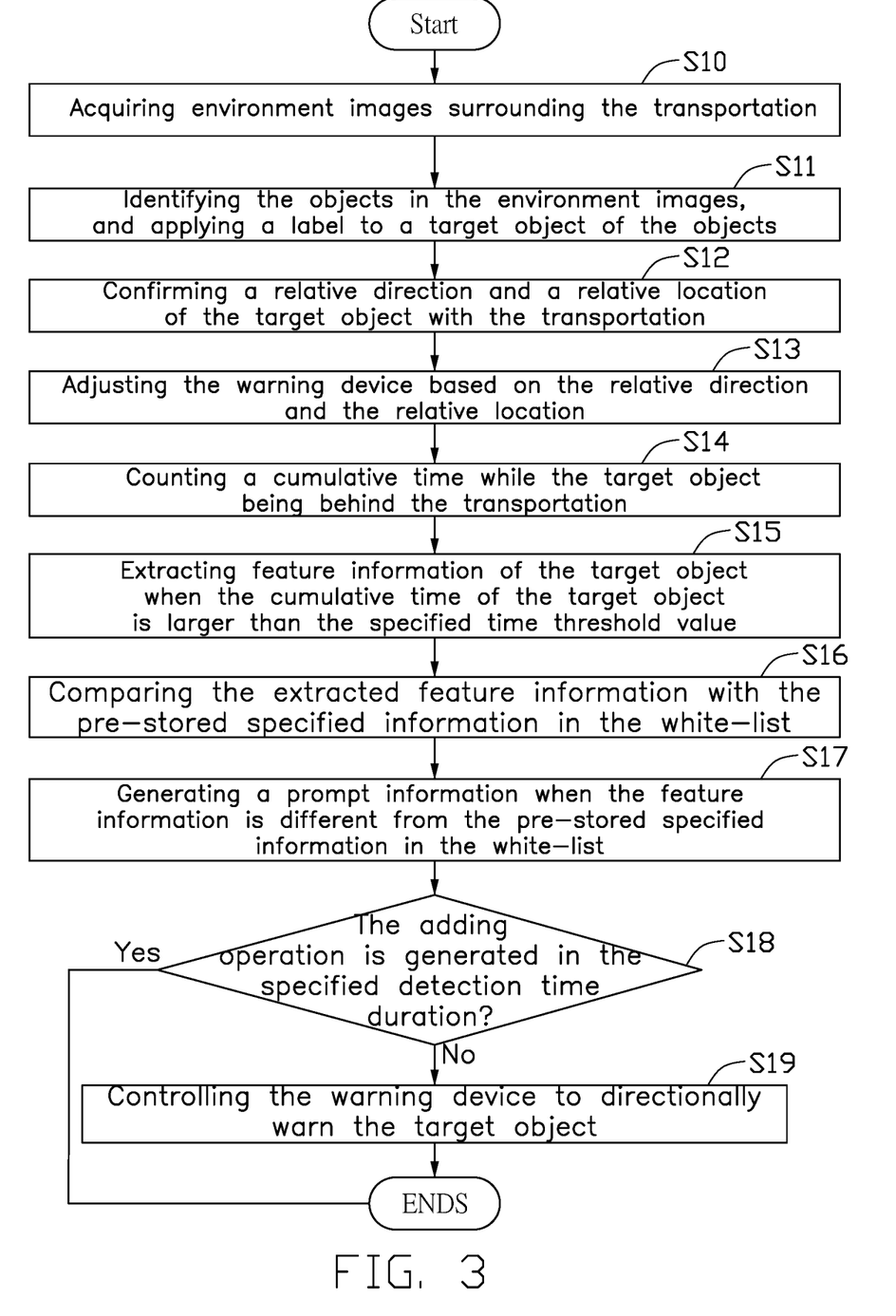
FIG. 3 is a flowchart illustrating an embodiment of method for giving directional warning as to a collision.

FIG. 3 shows a flowchart of a method for giving directional warning as to risk of a collision from behind a transportation 100 (as shown in FIG. 1). In at least one embodiment, the method is used in the collision risk warning system 1 of the transportation 100. The transportation 100 can include some or more hardware or software than in FIGS. 1 and 2, or the elements can be in a different location. The transportation 100 can provide a visible interface. The visible interface provides an interface for user to communicate with the transportation 100. The user can use mobile phone or computer to connect with the transportation 100.

The transportation 100 processes the program codes in the storage 102 by the processor 103 to execute the image acquisition module 10, the image identification module 20, the controlling module 30, the detection module 40, the timing module 50, the extraction module 60, and the prompting module 70, and communicates with the warning device 105 and the at least one image capturing device 106 to implement the method for real-time pedestrian statistic.

The method may comprise at least the following steps, which also may be re-ordered:

In block S10, the image acquisition module 10 acquires environment images surrounding the transportation 100.

In one embodiment, the image acquisition module 10 acquires the environment images surrounding the transportation 100 by the image capturing device 106. The environment images surrounding the transportation 100 can be an image of scene behind the transportation 100 or scene at a side of the transportation 100, not being limited.

In block S11, the image identification module 20 identifies the objects in the environment images, and applies a label to a target object from the objects.

In one embodiment, the target object can be a movable object, such as a motor vehicle, a non-motor vehicle, a pedestrian, an air vehicle, or an animal, not being limited.

Further, the image identification module 20 isolates the target objects from the environment images by an object detection algorithm. Selectively, sizes of the objects cut by the image identification module 20 from the environment images by the object detection algorithm is detected. When a size of the object is larger than a specified minimum threshold value, the object is considered as the target object. The specified minimum threshold value represents a safe distance between the object and the transportation 100.

When there is more than one target object larger than the specified minimum threshold value, the image identification module 20 considers the object with a greatest size as the target object.

In one embodiment, the image identification module 20 can classify the objects, and sets different specified minimum threshold values corresponding to different categories. For example, a transportation category corresponds to a first specified minimum threshold value, an animal category corresponds to a second specified minimum threshold value, and an air vehicle category corresponds to a third specified minimum threshold value.

In block S12, the controlling module 30 confirms a relative direction and a relative location of the target object with the transportation 100.

In block S13, the controlling module 30 adjusts the warning device 105 based on the relative direction and the relative location.

In one embodiment, the aim region overlaps at least a part of the target object.

In block S14, the timing module 50 counts a cumulative time while the target object being behind the transportation 100.

In block S15, the extraction module 60 extracts feature information of the target object when the cumulative time of the target object is larger than the specified time threshold value.

In one embodiment, the feature information of the target object includes license plate number or a face information of the driver of the target object. In other embodiments, the feature information can be a shape of the target object, not being limited.

When the cumulative time is less than or equal to the specified time threshold value, the timing module 50 considers the target object as a normal transportation.

In block S16, the extraction module 60 compares the extracted feature information with the pre-stored specified information in the white-list.

In block S17, the prompting module 70 generates a prompt information when the feature information is different from the pre-stored specified information in the white-list.

In one embodiment, the prompt information is a pop-up window displayed on the transportation 100 or a display of a terminal device communicating with the transportation 100. In other embodiments, the prompt information can be shown in a full screen or in a notification bar. The terminal device can be a mobile phone, a wearable device, or an automobile data recorder, not being limited. The prompting information includes an adding key and a rejecting key. In one embodiment, an adding operation or a rejecting operation can be generated by a touch operation or a gesture operation on the transportation 100 or the terminal device communicating with the transportation 100. The adding key and the rejecting key can be virtual keys or physical keys.

In block S18, the prompting module 70 detects whether the adding operation is generated in a specified detection time duration.

When the adding operation is generated, the procedure ends.

In block S19, the controlling module 30 controls the warning device 105 to directionally warn the target object when there is no adding operation is generated in the specified detection time duration or a rejecting operation is generated in the specified detection time duration.

Figure 4:
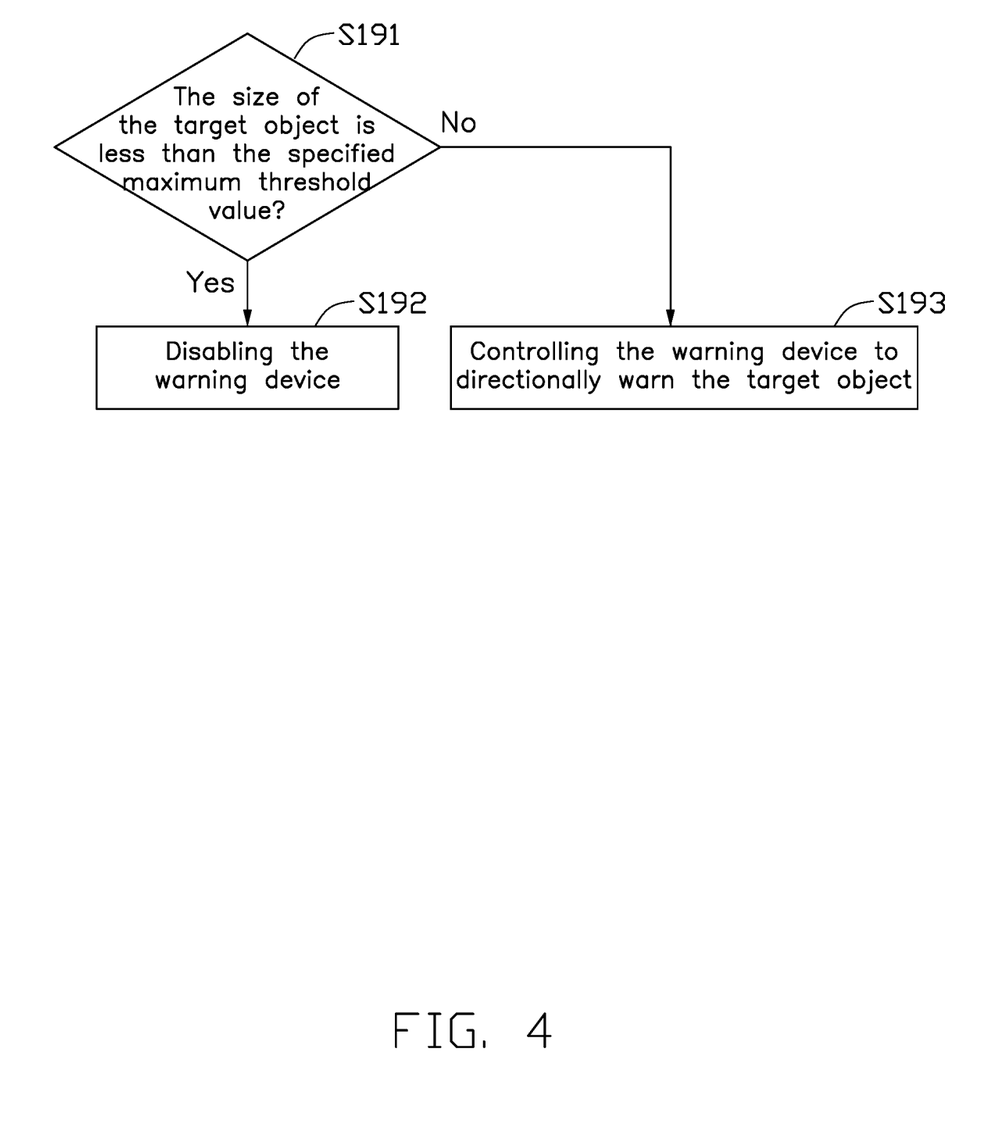
FIG. 4 is a detailed flowchart illustrating an embodiment of block S19 in the method of FIG. 3.

FIG. 4 illustrates a detail flowchart of the block 19. The block 19 further includes the following steps.

In block S191, the detection module 40 detects whether the size of the target object is less than a specified maximum threshold value.

When the size of the target object is less than the specified maximum threshold value, the detection module 40 considers the target object as sufficiently far away from the transportation 100. When the size of the target object is larger than or equal to the specified maximum threshold value, the detection module 40 considers the target object to potentially affect the driving of the transportation 100.

In block S192, the controlling module 30 disables the warning device 105 when the size of the target object is less than the specified maximum threshold value.

In block S193, the controlling module 30 controls the warning device 105 to directionally warn the target object when the size of the target object is larger than or equal to the specified maximum threshold value.

Based on the method for directionally warning the target object behind the transportation 100, the objects behind the transportation 100 is captured by the image capturing device 106, the target object from the objects is identified, and a directionally warning is generated when the target object is close to the transportation 100. The aim region can be adjusted due to different warning devices 105.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method in a transportation; the transportation comprises a warning device, at least one image capturing device, a processor and a storage with at least one command;
   the at least one command is implemented by the processor to execute the following steps:
   acquiring environment images surrounding the transportation;
   identifying objects in the environment images, and applying a label to a target object from the objects;
   confirming a relative direction and a relative location of the target object with the transportation;
   adjusting an aim region of the warning device to partly overlap the target object based on the relative direction and the relative location of the target object with the transportation to face the target object; and
   controlling the warning device to directionally warn the target object, wherein identifying the objects in the environment images, and labeling a target object from the objects comprises:
   detecting a size of each of the identified objects; and
   determining an object, of the identified objects, having the size larger than a specified minimum threshold value as the target object;
   wherein the transportation stores some pre-stored specified information in a white-list; the method further comprises:
   counting a cumulative time while the target object being behind the transportation;
   extracting feature information of the target object when the cumulative time of the target object is larger than a specified time threshold value;
   comparing the extracted feature information with pre-stored specified information in a white-list;
   generating a prompt information when the feature information is different from the pre-stored specified information in the white-list; and
   controlling the warning device to directionally warn the target object based on operations on the prompt information.

2. The method of claim 1, wherein when the target object is a vehicle; the warning device emits an object to a passenger seat of the vehicle without directly interfering a driving action for directionally warn.

3. The method of claim 1, wherein the step of adjusting the warning device based on the relative direction and the relative location comprises:
   whether the size of the target object is less than a specified maximum threshold value; and
   when the size of the target object is larger than or equal to the specified maximum threshold value, controlling the warning device to directionally warn the target object based on the relative direction and the relative location.

4. The method of claim 1, wherein the prompt information comprises an adding key and a rejecting key; an adding operation is generated by clicked the adding key, and a rejecting operation is generated by clicked the rejecting key.

5. A collision risk warning system in a transportation, the collision risk warning system comprises:
   a warning device configured to directionally warn;
   at least one image capturing module configured to acquire environment images surrounding the transportation;
   a processor; and
   a storage configured to store one or more programs, which when executed by the processor, cause the processor to:
   acquire environment images surrounding the transportation by the at least one image capturing module;
   identify the objects in the environment images, and apply a label to a target object from the objects;
   confirm a relative direction and a relative location of the target object with the transportation;
   adjust an aim region of the warning device to partly overlap the target object based on the relative direction and the relative location of the target object with the transportation to face the target object; and
   control the warning device to directionally warn the target object;
   wherein the processor further detects a size of each of the identified objects; the processor further determines an object, of the identified objects, having the size larger than a specified minimum threshold value as the target object;
   wherein the processor further counts a cumulative time while the target object being behind the transportation, extracts feature information of the target object when the cumulative time of the target object is larger than a specified time threshold value, compares the extracted feature information with pre-stored specified information in a white-list, generates a prompt information when the feature information is different from the pre-stored specified information in the white-list, and controls the warning device to directionally warn the target object based on operations on the prompt information.

6. The collision risk warning system of claim 5, wherein when the target object is a vehicle; the warning device emits an object to a passenger seat of the vehicle without directly interfering a driving action for directionally warn.

7. The collision risk warning system of claim 5, wherein the processor further detects whether the size of the target object is less than a specified maximum threshold value; when the size of the target object is larger than or equal to the specified maximum threshold value, the processor controls the warning device to directionally warn the target object based on the relative direction and the relative location.

8. The collision risk warning system of claim 5, the prompt information comprises an adding key and a rejecting key; an adding operation is generated by clicked the adding key, and a rejecting operation is generated by clicked the rejecting key.

9. A transportation comprises a processor and a storage; the processor executes program codes stored in the storage; the storage comprises:
- an image acquisition module, configured to acquire environment images surrounding the transportation;
- an image identification module, configured to identify objects in the environment images, and apply a label to a target object from the objects; and
- a controlling module, configured to adjust an aim region of a warning device to partly overlap the target object based on the relative direction and the relative location of the target object with the transportation to face the target object, and control the warning device to directionally warn the target object;
- wherein the image identification module further detects a size of each of the identified objects and determines an object, of the identified objects, having the size larger than a specified minimum threshold value as the target object;
- wherein the storage further comprise a timing module, an extraction module, and a prompting module; the timing module counts a cumulative time while the target object being behind the transportation; the extraction module extracts feature information of the target object when the cumulative time of the target object is larger than a specified time threshold value; the extraction module further compares the extracted feature information with pre-stored specified information of a white-list in the storage; the prompting module generates a prompt information when the feature information is different from the pre-stored specified information in the white-list; and the controlling module controls the warning device to directionally warn the target object based on operations on the prompt information.

10. The transportation of claim 9, wherein when the target object is a vehicle; the warning device emits an object to a passenger seat of the vehicle without directly interfering a driving action for directionally warn.

11. The transportation of claim 9, wherein the storage further comprises a detection module; the detection module detects whether the size of the target object is less than a specified maximum threshold value; when the size of the target object is larger than or equal to the specified maximum threshold value, the detection module considers the target object to affect the driving of the transportation, and the controlling module controls the warning device to directionally warn the target object based on the relative direction and the relative location.

12. The transportation of claim 9, wherein the prompt information comprises an adding key and a rejecting key; an adding operation is generated by clicked the adding key, and a rejecting operation is generated by clicked the rejecting key.

* * * * *